United States Patent [19]

Komatsu et al.

[11] 4,021,259

[45] May 3, 1977

[54] GYPSUM COMPOSITION

[75] Inventors: Koei Komatsu, Tokyo; Kunihiro Harada, Yokkaichi; Seiji Aotani, Yokohama; Akio Itabashi, Kawasaki, all of Japan

[73] Assignee: Japan Synthetic Rubber Co., Ltd., Tokyo, Japan

[22] Filed: July 24, 1975

[21] Appl. No.: 598,598

Related U.S. Application Data

[63] Continuation of Ser. No. 371,219, June 18, 1973, abandoned.

[30] Foreign Application Priority Data

June 19, 1972 Japan .............................. 47-61113

[52] U.S. Cl. ................................ 106/111; 106/314

[51] Int. Cl.$^{2}$ .......................................... C04B 11/14

[58] Field of Search .................. 106/111, 314, 315

[56] References Cited

UNITED STATES PATENTS 3,284,227 11/1966 Gerton .............................. 106/111

*Primary Examiner*—J. Poer

*Attorney, Agent, or Firm*—Ladas, Parry, Von Gehr, Goldsmith & Deschamps

[57] ABSTRACT

A gypsum composition obtained by molding and drying an aqueous slurry comprising calcined gypsum, polyvinyl alcohol, and at least one metal compound. The composition has high surface hardness and high water resistance.

8 Claims, No Drawings

GYPSUM COMPOSITION

This is a continuation, of application Ser. No. 371,219 filed June 18, 1973, now abandoned.

This invention relates to an improvement in water resistance and surface hardness of a gypsum-polyvinyl alcohol (hereinafter referred to as PVA) composition.

Attempts have long been made to make hydraulic compounds (calcined gypsum, cement, etc.) lighter in weight or higher in strength by addition of high molecular weight compounds. In spite of the fact that the use of an aqueous solution of PVA as hydrating solution for calcined gypsum is desirable in view of dispersion of PVA and also of a reinforcing effect of PVA (French Pat. No. 1,013,252), PVA has never been in practical use as a reinforcement, presumably because a gypsum-PVA composition is much inferior in water resistance and also is unsatisfactory in surface hardness.

The present inventors have found that it is possible to obtain a gypsum composition, which is water-resistant and has high surface hardness, without losing the merits of the addition of PVA by crosslinking the PVA within the gypsum with the aid of water-soluble metal compounds.

An object of this invention is to provide a water resistant gypsum-PVA composition.

Another object of this invention is to provide a water resistant gypsum-PVA composition having high surface hardness.

A further object of this invention is to provide a gypsum-PVA composition which can be used as a building material.

Other objects and advantages of this invention will be apparent from the following description.

According to this invention, there is provided a gypsum composition obtained by molding and drying an aqueous slurry comprising calcined gypsum, polyvinyl alcohol, and at least one metal compound.

As the PVA in the present composition, there may be used a conventional PVA as obtained by saponification of polyvinyl acetate, and a partially saponified product may be used so long as the degree of saponification is 50% or higher. The amount of PVA may vary depending on the degree of polymerization and the degree of saponification thereof, and is usually 0.1 to 50 parts by weight, preferably 0.5 to 20 parts by weight, per 100 parts by weight of calcined gypsum.

The metal compounds for use in this invention, which easily form a chelate bond with the hydroxy group in the PVA, may be used alone or in admixture of one or more, and are, for example, compounds of metals of Groups Ib, II, IIa, IV, Vb, VIIb, and VIII of the Periodic Table. Examples of the metals for use are Cu, Ag, and Au as Group Ib; Be, Mg, Ca, Sr, Ba, Zn, Cd, and Hg as Group II; Al as Group IIIa; Si, Sn, Pb, Ti, and Zr as Group IV; V and Nb as Group Vb; Cr, Mo, and W as group VIb; Mn as Group VIIb; and Fe, Co, and Ni as Group VIII. Among these metals, Cu, Ca, Zn, Al, Si, Sn, Ti, Cr, Mo, Mn, Fe and Ni are preferably used in the present invention. In view of polution and color of composition, Ca, Si and Ti are most preferable. Compounds of these metals include sulfates, nitrates, carbonates, acetates, halides, hydroxides, oxides and so on. Examples of individual compounds are copper acetate, copper nitrate, copper sulfate, copper bromide, copper iodide, magnesium iodide, calcium acetate, strontium nitrate, barium oxide, zinc chloride, zinc acetate, cadmium fluoride, mercuric acetate, aluminum chloride, aluminum sulfate, silicon oxide, stanuous chloride, stannic chloride, stanuous sulfate, lead acetate, titanium sulfate, titanium hydroxide, zirconium oxychloride, vanadium trichloride, vanadium pentoxide, niobium chloride, chromous chloride, potassium bichromate, molybdenum oxide, tungstic acid, manganese chloride, manganese dioxide, manganese acetate, ferrous chloride, ferric chloride, ferric nitrate, cobaltous sulfate, cobalt acetate, nickel chloride, and nickel acetate. Calcium acetate, silicon oxide and titanium sulfate are particularly preferable.

When the metal compound itself is not water-soluble, it can be used either in the form of a suspension or after having been made water-soluble by the addition of an inorganic acid such as hydrogen halide, sulfuric acid, or nitric acid; an organic acid such as a carboxylic acid, for example, formic acid, or chloroacetic acid or an organic sulfonic acid, for example, benzenesulfonic acid or p-toluenesulfonic acid; or an amine such as an ammonia, pyridine or an alkyl derivative thereof, pyrrole or an alkyl derivative thereof, triethylenediamine, dimethylamine, or diethylemine.

Acids act, in most cases, to adjust the start and the rate of the crosslinking reaction of PVA with a metal compound. Amines are coordinated with the metal to enhance the solubility of the metal compound in water. Therefore, the time required for crosslinking can be controlled by the quantity of an acid or amine added.

The gypsum composition which is excellent in strength, improved in surface hardness, and resistant to penetration of water, can be obtained by adding an aqueous solution or suspension of at least one metal compound (said aqueous solution or suspension may be either acidic or alkaline) together with calcinated gypsum to an aqueous solution of PVA, or, alternatively, adding, with stirring, calcined gypsum to a mixture of said liquid components, to form a viscous slurry, and pouring the slurry into a desired mold to allow the slurry to solidify into a molded article.

The amount of the metal compound necessary to manifest effectively the said action in the composition of this invention is within the range of 0.001 to 1 mole, preferably 0.004 to 0.1 mole per one hydroxy group in PVA.

The amount of water contained in the slurry of the invention may be the same as used in producing an ordinary cast gypsum, that is, 50 to 120 parts by weight per 100 parts by weight of calcined gypsum. The amount of PVA which can be added varies depending on the amount of water added.

By adding to the aqueous slurry of this invention synthetic fibers such as rayon, Vinylon, nylon, and polypropylene, natural fibers or cellulose such as cotton and pulp, or mineral fibers such as glass and asbestos, it is possible to further improve the flexural strength and impact resistance of the composition and to obtain a foamed and light weight product thereof owing to the surface activity of PVA itself without detracting from the merits of this invention. These fibrous materials give a maximum strength when added in an amount of 0.5 to 10, preferably 1 to 5 parts by weight per 100 parts by weight of calcined groups.

Density reduction of the gypsum composition can be effected either by foaming of PVA itself, or by addition of density-reducing materials such as foamed polystyrene beads, "Shirasu" balloon, perlite, and wood flour. Addition of "Shirasu", glass powder, clay or PVA powder increases the strength of the composition. Other materials such as a filler may be added without deteriorating the strength of the composition. By incorporation of pigments or dyes, the gypsum composition of this invention becomes usable as decorative boards. The amount of the density-reducing material or filler added is 0.5 to 200, preferably 1 to 100, parts by weight per 100 parts by weight of calcined gypsum.

The gypsum composition of the present invention may be used as a building material and a decorative material. When used in the form of a so-called gypsum board as a ceiling board or a wall board for the purposes of sound absorption and fire-proofing the shaped articles obtained from the composition of this invention have an advantage in that they need not be overlayed with paper on either side, as with conventional gypsum boards, and can be used as produced.

The invention is further illustrated below in detail with reference to Examples, but the invention should not be understood to be limited to the Examples.

In the Examples, the testing of physical properties of the gypsum composition was carried out in the following way: A test specimen was prepared by drying a solidified shaped article in an air stream at 60° C, for 48 hours, and then keeping the dried article at 20° C. and 45 to 55% relative humidity for 2 days or more. The testing for flexural strength and compressive strength was carried out according to JIS R 5201. Izod impact strength was tested on a test piece of 1.27 × 1.27 × 6.35 cm (unnotched). Following the procedure of JIS-K 5401, pencil hardness was expressed as the minimum hardness of a pencil which can scrape off the surface of the gypsum composition. The testing was conducted with pencils of 9H to 6B by use of a pencil scratch tester (9H shows the maximum hardness and 6B the minimum hardness).

EXAMPLE 1

In 600 cc of water were dissolved 10 g of a 100%-saponified PVA having a degree of polymerization of 1,500 and 2.27 g of cupric acetate (corresponding to Cu/OH = 1/20). To the resulting solution was added 1,000 g of calcined gypsum and stirred to form a viscous slurry which was then cast to prepare a gypsum composition (this formulation is expressed as calcined gypsum: water: PVA: Cu/OH = 100: 60: 1: 1/20; similar expressions shall apply hereinafter). Similarly, a number of gypsum compositions were prepared with the following combination of formulations: calcined gypsum: water: PVA: Cu/OH = 100: 60, 80, or 100: 1,3, or 50: 1/20, 1/50, or 1/100 (Table 1, Run Nos. 13 to 39). Run Nos. 1 to 3 are Compaarative Examples in which only gypsum was used, and Run Nos. 4 to 12 are Comparative Examples in which only gypsum-PVA was used. The results of tests on physical properties of the above gypsum compositions were as shown in Table 1.

In Tables 2 and 3 are shown the results of test conducted on the above gypsum compositions which had been immersed in water at 2O° C. for 24 hours and then dried in an air stream at 60° C. for 48 hours, and on wet gypsum compositions after immersion in water (20° C.) for 2 hours, respectively.

From these physical characteristics, it is seen that as compared with gypsum or gypsum-PVA alone, the gypsum-PVA-metal compound systems of this invention are far superior in surface hardness and wet strength (see Tables 1, 2 and 3).

Table 1

| Run No. | Formulation: Water (PHG) | Formulation: PVA (PHG) | Formulation: Cu/OH | Specific strength: Flexural ($kg/cm^2/\rho$) | Specific strength: Compressive ($kg/cm^2/\rho$) | Specific strength: Izod impact ($kg.cm/cm^2/\rho$) | Pencil hardness | Specific gravity ($\rho = g/cm^3$) |
|---|---|---|---|---|---|---|---|---|
| 1 | 60 | — | — | 57 | 143 | 0.8 | 3B | 1.20 |
| 2 | 80 | — | — | 40 | 93 | 1.0 | Softer than 6B | 0.99 |
| 3 | 100 | — | — | 25 | 70 | 0.7 | Softer than 6B | 0.85 |
| 4 | 60 | 1 | — | 84 | 167 | 1.1 | HB | 1.16 |
| 5 | 80 | " | — | 62 | 100 | — | B | 0.98 |
| 6 | 100 | " | — | 47 | 68 | 0.9 | B | 0.85 |
| 7 | 60 | 3 | — | 94 | 171 | 1.4 | H | 1.11 |
| 8 | 80 | " | — | 70 | 102 | — | HB | 0.96 |
| 9 | 100 | " | — | 58 | 70 | 1.8 | HB | 0.85 |
| 10 | 60 | 5 | — | 108 | 199 | 1.3 | H | 1.05 |
| 11 | 80 | " | — | 80 | 97 | — | H | 0.90 |
| 12 | 100 | " | — | 73 | 78 | 1.3 | HB | 0.85 |
| 13 | 60 | 1 | 1/20 | 84 | 180 | 1.1 | H | 1.17 |
| 14 | 80 | " | " | 56 | 96 | — | F | 0.98 |
| 15 | 100 | " | " | 44 | 67 | 1.4 | F | 0.85 |
| 16 | 60 | " | 1/50 | 91 | 167 | 1.2 | HB | 1.16 |
| 17 | 80 | " | " | 59 | 91 | — | B | 0.97 |
| 18 | 100 | " | " | 47 | 69 | 1.1 | H | 0.85 |
| 19 | 60 | " | 1/100 | 80 | 153 | 1.0 | H | 1.15 |
| 20 | 80 | " | " | 52 | 90 | — | F | 0.98 |
| 21 | 100 | " | " | 40 | 660 | 1.1 | HB | 0.85 |
| 22 | 60 | 3 | 1/20 | 73 | 114 | 1.2 | H | 1.07 |
| 23 | 80 | " | " | 51 | 62 | — | H | 0.98 |
| 24 | 100 | " | " | 45 | 47 | 0.9 | H | 0.85 |
| 25 | 60 | " | 1/50 | 93 | 158 | 1.8 | 2H | 1.09 |
| 26 | 80 | " | " | 61 | 86 | — | 3H | 0.96 |
| 27 | 100 | 3 | 1/50 | 53 | 67 | 1.2 | 4H | 0.85 |
| 28 | 60 | " | 1/100 | 98 | 167 | 1.3 | 4H | 1.09 |
| 29 | 80 | " | " | 63 | 100 | — | 4H | 0.98 |
| 30 | 100 | " | " | 59 | 80 | 1.5 | H | 0.86 |
| 31 | 60 | 5 | 1/20 | 72 | 120 | 1.5 | 3H | 0.99 |
| 32 | 80 | " | " | 54 | 70 | 1.2 | 2H | 0.89 |
| 33 | 100 | " | " | 49 | 52 | 1.0 | 2H | 0.86 |
| 34 | 60 | " | 1/50 | 93 | 137 | 1.5 | 4H | 1.03 |
| 35 | 80 | " | " | 60 | 84 | 1.2 | 4H | 0.88 |

Table 1-continued

| Run No. | Formulation Water (PHG) | PVA (PHG) | Cu/OH | Specific strength Flexural (kg/cm²/ρ) | Compressive (kg/cm²/ρ) | Izod impact (kg.cm/cm²/ρ) | Pencil hardness | Specific gravity (ρ = g/cm³) |
|---|---|---|---|---|---|---|---|---|
| 36 | 100 | " | " | 58 | 70 | 0.9 | 4H | 0.86 |
| 37 | 60 | " | 1/100 | 96 | 127 | 1.5 | 4H | 1.03 |
| 38 | 80 | " | " | 63 | 85 | 1.0 | 3H | 0.96 |
| 39 | 100 | " | " | 55 | 67 | 0.7 | 2H | 0.85 |

Note:
PHG denotes parts by weight per 100 parts by weight of calcined gypsum; the same shall apply hereinafter.

As is apparent from Table 1, the addition of PVA to gypsum results in an increase in strength (especially flexural strength); the addition of copper acetate does not further increase the strength but increases the surface hardness; the more PVA or copper acetate the composition contains, the higher the surface hardness becomes.

Table 2

| Run No. | Formulation Water (PHG) | PVA (PHG) | Cu/OH | Time required to reach equilibrium water content (hour) | Dry specimen* Weight decrease (%) | Flexural strength (kg/cm²) | | Compressive strength (kg/cm²) | |
|---|---|---|---|---|---|---|---|---|---|
| 1 | 60 | — | — | <¼ | 1.1 | 73 | (69) | 196 | (173) |
| 4 | 60 | 1 | — | ½ | 1.4 | 84 | (98) | 167 | (194) |
| 7 | " | 3 | — | ¾ | 1.9 | 90 | (104) | 148 | (190) |
| 10 | " | 5 | — | 1 | 2.2 | 94 | (113) | 156 | (209) |
| 13 | 60 | 1 | 1/20 | 1½ | 0.8 | 98 | (98) | 191 | (211) |
| 16 | " | " | 1/50 | 2 | 1.0 | 100 | (106) | 215 | (194) |
| 19 | " | " | 1/100 | 4 | 1.1 | 110 | (92) | 162 | (176) |
| 22 | " | 3 | 1/20 | 24 | 1.0 | 93 | (78) | 142 | (122) |
| 25 | " | " | 1/50 | 24 | 0.9 | 111 | (101) | 168 | (172) |
| 28 | " | " | 1/100 | 24 | 1.1 | 123 | (107) | 188 | (182) |
| 31 | 60 | 5 | 1/20 | >24 | 1.1 | 68 | (71) | 113 | (119) |
| 34 | " | " | 1/50 | >24 | 1.1 | 94 | (96) | 165 | (141) |
| 37 | " | " | 1/100 | >24 | 1.3 | 117 | (99) | 192 | (131) |
| 3 | 100 | — | — | <¼ | — | 21 | (21) | 54 | (60) |
| 6 | 100 | 1 | — | <¼ | — | 30 | (38) | 55 | (58) |
| 9 | " | 3 | — | ½ | — | 21 | (49) | 44 | (59) |
| 12 | " | 5 | — | ¾ | — | 39 | (62) | 38 | (66) |
| 15 | 100 | 1 | 1/20 | ½ | — | 44 | (37) | 70 | (57) |
| 18 | " | " | 1/50 | 1 | — | 43 | (40) | 71 | (59) |
| 21 | " | " | 1/100 | 1 | — | 59 | (34) | 70 | (56) |
| 24 | " | 3 | 1/20 | 1 | — | 61 | (38) | 60 | (40) |
| 27 | " | " | 1/50 | 4 | — | 68 | (45) | 72 | (57) |
| 30 | " | " | 1/100 | 24 | — | 72 | (51) | 86 | (68) |
| 33 | " | 5 | 1/20 | 1 | — | 60 | (42) | 61 | (45) |
| 36 | 100 | 5 | 1/50 | 4 | — | 71 | (50) | 75 | (60) |
| 39 | " | " | 1/100 | >24 | — | 86 | (47) | 89 | (57) |

Note:
*After immersion in water (20° C.) for 24 hours, dried in an air stream at 60° C. for 48 hours.
Figures in parenthese are initial strengths.

From Table 2, it is seen that as compared with the case where only PVA is added, the compositions containing copper acetate in addition to PVA require far longer time to reach an equilibrium water content and most of the dry specimens show more improved strength.

Table 3

| Run No. | Formulation Water (PHG) | PVA (PHG) | Cu/OH | Wet product immersed in water (20° C) for 2 hours: Water Absorption % | Immersed length* (mm) | Strength Flexural (kg/cm²) | Compress. (kg/cm²) | Decrease in strength (%) Flexural | Compress. |
|---|---|---|---|---|---|---|---|---|---|
| 1 | 60 | — | — | 28 | Full | 37 | 85 | 56 | 54 |
| 4 | 60 | 1 | — | 29 | " | 27 | 62 | 77 | 73 |
| 7 | " | 3 | — | 31 | " | 24 | 40 | 82 | 84 |
| 10 | " | 5 | — | 21 | " | 27 | 44 | 80 | 82 |
| 13 | 60 | 1 | 1/20 | 18 | " | 48 | 81 | 47 | 47 |
| 16 | " | " | 1/50 | 10 | 12 | 51 | 104 | 45 | 32 |
| 19 | " | " | 1/100 | 7 | 1 | 64 | 113 | 28 | 22 |
| 22 | " | 3 | 1/20 | 9 | 1–8 | 47 | 64 | 40 | 38 |
| 25 | " | " | 1/50 | 6 | 2–3 | 53 | 87 | 40 | 35 |
| 28 | 60 | 3 | 1/100 | 4 | 1 | 69 | 104 | 29 | 29 |
| 31 | " | 5 | 1/20 | 7 | 6 | 51 | 64 | 38 | 34 |
| 34 | " | " | 1/50 | 4 | 2 | 62 | 100 | 29 | 27 |
| 37 | " | " | 1/100 | 2 | 1 | 82 | 126 | 12 | 5 |

Note:
Test specimen of the gypsum composition: 4 × 4 × 16 cm ; vertically immersed in water.

From Table 3 it is seen that as compared with the case where only PVA is added, the compositions containing copper acetate in addition to PVA become more resistant to penetration of water and show only a small decrease in strength.

EXAMPLE 2

In a manner similar to that in Example 1 and using a 100%-saponified PVA having a degree of polymerization of 500, gypsum compositions of the following formulation were prepared: calcined gypsum: $H_2O$: PVA-Cu/OH = 100: 60 or 80: 10 or 20: 1/100. Physical properties were as shown in Table 4. These compositions were found to have also similar merits to those mentioned in Example 1.

Table 4

| Run No. | Formulation H₂O (PHG) | Formulation PVA (PHG) | Formulation Cu/OH | Specific strength Flexural (kg/cm²/ρ) | Specific strength Compress (kg/cm²/ρ) | Specific strength Izod impact (kg.cm/cm²/ρ) | Pencil hardness | Sp. gr. (ρ = g/cm³) |
|---|---|---|---|---|---|---|---|---|
| 40 | 80 | 20 | 1/100 | 85 | 115 | 2.1 | 5H | 0.95 |
| 41 | 60 | 10 | " | 100 | 193 | 1.9 | 5H | 1.01 |

EXAMPLE 3

In a manner similar to that in Example 1 and using 10 types of PVA having degree of polymerization of 500 to 2,600 and degrees of saponfication of 80 to 100%, gypsum compositions of the following formulations were prepared: calcined gypsum: water: VPA: Cu/OH = 100: 60: 3: 1/50. Physical properties of the compositions were as shown in Table 5. These compositions were found to have similar merits to those mentioned in Example 1.

Table 5

| Run No. | PVA Degree of polymerization | PVA Degree of saponification (%) | Specific strength Flexural (kg/cm²/ρ) | Specific strength Compress. (kg/cm²/ρ) | Specific strength Izod impact (kg.cm/cm²/ρ) | Pencil hardness | Sp. gr. (ρ = g/cm³) |
|---|---|---|---|---|---|---|---|
| 42 | 2600 | 100 | 113 | 233 | 1.3 | 5H | 1.16 |
| 43 | 1800 | 100 | 105 | 157 | 1.0 | 4H | 1.15 |
| 44 | 1400 | 100 | 104 | 186 | 1.2 | 5H | 1.14 |
| 45 | 500 | 100 | 91 | 168 | 1.5 | 4H | 1.20 |
| 46 | 1700 | 98 | 94 | 155 | 1.1 | 3H | 1.14 |
| 47 | 2000 | 88 | 102 | 172 | 1.0 | 2H | 1.06 |
| 48 | 1700 | 88 | 92 | 140 | 1.2 | 2H | 1.03 |
| 49 | 1400 | 88 | 92 | 142 | 0.8 | 3H | 1.07 |
| 50 | 500 | 88 | 95 | 129 | 0.8 | 2H | 1.14 |
| 51 | 1700 | 80 | 87 | 173 | 0.9 | 2H | 1.01 |

From Table 5, it is seen that the greater the degree of polymerization and degree of saponification of PVA, the higher the strength and surface hardness of the gypsum composition become.

EXAMPLE 4

Following the procedure of Example 1 and using PVA having a degree of polymerization of 1,500 and a degree of saponification of 100%, gypsum compositions were prepared by molding a slurry of the following formulation which had been filled with 1, 3, or 5 PHG of glass fiber, 8 mm in length and 10 μ m in diameter (Run Nos. 52 to 54), Vynilon fiber, 5 mm in length and 0.25 μ m in diameter (Run Nos. 55 to 57), or polypropylene fiber, 3 mm in length and 0.25 μ m in diameter (Run Nos. 58 to 60): calcined gypsum: water: PVA: Cu/OH = 100: 100: 3: 1/50.

In a similar manner, gypsum compositions were prepared from a slurry of the following formulation which had been filled with 5, 10, 30, or 50 PHG of "Shirasu", 24 mesh or smaller in size (Run Nos. 61 to 64; Comparative Examples 65 and 66). Physical properties of the above compositions were as shown in Table 6. Similar merits to those mentioned in Example 1 were found.

Table 6

| Run No. | Formulation Water (PHG) | Formulation PVA (PHG) | Formulation Cu/OH | Filler Type | Filler Amount (PHG) | Specific strength Flexural (kg/cm²/ρ) | Specific strength Compress. (kg/cm²/ρ) | Specific strength Izod impact (kg.cm/cm²/ρ) | Sp. gr. (ρ = g/cm³) | Pencil Hardness |
|---|---|---|---|---|---|---|---|---|---|---|
| 52 | 100 | 3 | 1/50 | Glass fiber | 1 | 57 | 70 | 3.3 | 0.83 | 4H |
| 53 | " | " | " | " | 3 | 76 | 67 | 9.3 | 0.84 | 5H |
| 54 | " | " | " | " | 5 | 76 | >80 | 17.4 | 0.75 | 5H |
| 55 | " | " | " | Vinylon fiber | 1 | 69 | 81 | 3.0 | 0.83 | 4H |
| 56 | " | " | " | " | 3 | 77 | 87 | 5.4 | 0.84 | 5H |
| 57 | " | " | " | " | 5 | 80 | 83 | 9.1 | 0.75 | 5H |
| 58 | " | " | " | PP fiber | 1 | 66 | 74 | 2.7 | 0.82 | 6H |
| 59 | " | " | " | " | 3 | 68 | 78 | 5.5 | 0.81 | 5H |
| 60 | " | " | " | " | 5 | 67 | 68 | 5.6 | 0.75 | 5H |
| 61 | 60 | " | " | Shirasu | 5 | 84 | 152 | 0.9 | 1.17 | 4H |
| 62 | 60 | 3 | 1/50 | Shirasu | 10 | 101 | 184 | 2.0 | 1.16 | 4H |
| 63 | " | " | " | " | 30 | 72 | 134 | 0.9 | 1.00 | 5H |
| 64 | " | " | " | " | 50 | 43 | 82 | 1.1 | 0.89 | 6H |
| 65 | 60 | — | — | " | 5 | 50 | 160 | — | 1.21 | 3B |
| 66 | " | — | — | " | 10 | 60 | 135 | — | 1.26 | 2B |

It is seen that when filled with fibers, the composition is improved in flexural strength and impact resistance and that an effect of the addition of copper acetate is recognizable in surface hardness while the tendency of the water rsistance was similar to that in Example 1.

EXAMPLE 5 a. Following the procedure in Example 1 and using PVA having a degree of polymerization of 1,500 and a degree of saponification of 100% and molybdenum oxide dissolved in 30%-aqueous ammonia, gypsum compositions of the following formulations were prepared: calcined gypsum: water: PVA: Mo/OH: 30%-aqueous ammonia = 100: 60 or 100: 3 or 1: 1/100 or 1/50: 10 (Run Nos. 67 to 70).

b. In a similar manner and using a 35%-aqueous solution of titanium sulfate, gypsum compositions of the following formulations were prepared: calcined gypsum: water: PVA: Ti/OH = 100: 60, 80 or 100: 1 or 3: 1/50 (Run Nos. 71 to 75).

c. In a similar manner and using an aqueous solution of titanium sulfate admixed with concentrated hydrochloric acid, gypsum compositions of the following formulations were prepared: calcined gypsum: water: PVA: Ti/OH: concentrated hydrochloric acid = 100: 60, 80, or 100: 3: 1/50: 0.5 or 0.1 (Run Nos. 76 to 78).

d. In a similar manner and using an aqueous solution of zine acetate admixed with triethylenediamine, gypsum compositions of the following formulations were prepared: calcined gypsum: water: PVA: Zn/OH: triethylenediamine = 100: 60, 80, or 100: 1: 1/150: 0.001 (Run Nos. 79 to 81).

e. In a similar manner and using potassium bichromate, gypsum compositions of the following formulations were prepared: calcined gypsum: water: PVA: Cr/OH = 100: 60: 1 or 3: 1/50 (Run Nos. 82 and 83).

Physical properties of the gypsum compositions (a) to (e) were as shown in Table 7. Effects similar to those mentioned in Example 1 were observed.

Table 7

| Run No. | Formulation: Water (PHG) | PVA (PHG) | Metal compound | M/OH | Additive | Amount of additive (PHG) |
|---|---|---|---|---|---|---|
| 67 | 60 | 3 | $MoO_3$ | 1/100 | 30 %-aq. ammonia | 10 |
| 68 | " | " | " | 1/50 | " | " |
| 69 | 100 | 1 | " | 1/100 | " | " |
| 70 | " | " | " | 1/50 | " | " |
| 71 | 60 | 1 | $Ti(SO_4)_2$ | 1/50 | — | — |
| 72 | 80 | " | " | " | — | — |
| 73 | 100 | " | " | " | — | — |
| 74 | 80 | 3 | " | " | — | — |
| 75 | 100 | " | " | " | — | — |
| 76 | 60 | 3 | " | " | Conc. HCl | 0.4 |
| 77 | 80 | " | " | " | " | 0.1 |
| 78 | 100 | " | " | " | " | 0.1 |
| 79 | 60 | 1 | $Zn(ACO)_2$ | 1/150 | Triethylenediamine | 0.001 |
| 80 | 80 | " | " | " | " | " |
| 81 | 100 | " | " | " | " | " |
| 82 | 60 | 1 | $K_2Cr_2O_7$ | 1/50 | — | — |
| 83 | 60 | 3 | " | " | — | — |

| Specific gravity ($\rho$ = g/cm$^3$) | Specific strength: Flexural (kg/cm$^2$/$\rho$) | Compressive (kg/cm$^2$/$\rho$) | Pencil hardness |
|---|---|---|---|
| 1.15 | 99 | 148 | 4H |
| 1.11 | 107 | 176 | 4H |
| 1.20 | 100 | 186 | 2H |
| 1.20 | 108 | 150 | 3H |

Table 7-continued

| | | | |
|---|---|---|---|
| 1.16 | 95 | 219 | 4H |
| 1.00 | 77 | 110 | 3H |
| 0.87 | 48 | 79 | 3H |
| 0.95 | 86 | 115 | 5H |
| 0.86 | 65 | 87 | 3H |
| 1.05 | 94 | 130 | 2H |
| 0.89 | 70 | 94 | H |
| 0.80 | 59 | 75 | H |
| 1.22 | 98 | 152 | 3H |
| 1.00 | 63 | 97 | 2H |
| 0.87 | 55 | 77 | 2H |
| 1.21 | 105 | 212 | 5H |
| 1.17 | 107 | 201 | 6H |

With the addition of an aqueous solution of various metal compounds, the surface hardness becomes higher and the water resistance shows a tendency similar to that mentioned in Example 1.

EXAMPLE 6 a. In 700 cc of water was dissolved 30 g of PVA having a degree of polymerization of 1,500 and a degree of saponification of 89%. The solution was mixed with 3.30 g of aluminum chloride hexahydrate (corresponding to Al/OH = 1/50) dissolved in 100 ml of 1.8 N-hydrochloric acid. To the resulting mixed solution was added 1,000 g of calcined gypsum and stirred to form a viscous slurry which was then cast-molded and dried at 60° C. for 48 hours to prepare a gypsum composition. (This formulation is expressed as calcined gypsum: PVA: Al/OH: hydrogen chloride = 100: 80: 3: 1/50: 0.65.) (Run No. 84).

b. In a similar manner and using 0.8 g of silicon oxide suspended in 100 ml of 2.8%-aqueous ammonia, a gypsum composition was prepared with the following formulation: calcined gypsum: water: PVA: Si/OH: ammonia = 100: 8:; 3: 1/50: 0.05 (Run No. 85).

c. In a similar manner and using 3.1 g of stannous chloride dihydrate dissolved in 100 ml of 1 N-hydrochloric acid, a gypsum composition of the following formulation was prepared: calcined gypsum: water: PVA: Sn/OH: hydrogen chloride = 100: 80: 3: 1/50: 0.36 (Run No. 86).

d.In a simmilar manner and using 1.2 g of vanadium pentoxide dissolved in 100 ml of 3.6 N-hydrochloric acid, a gypsum composition was prepared with the following formulation: calcined gypsum: water: PVA: V/OH: hydrogen chloride = 80: 3: 1/50: 1.3 (Run No. 87).

e. In a similar manner and using 1.2 g of manganese dioxide suspended in 100 ml of 1.4%-aqueous ammonia, a gypsum composition was prepared with the following formulation: calcined gypsum: water: PVA: Mn/OH: ammonia = 100: 80: 3: 1/50: 0.03 (Run No. 88).

f. In a similar manner and using 3.7 g of ferric chloride hexahydrate dissolved in 100 ml of water, gypsum compositions were prepared with the following formulation: calcined gypsum: water: PVA: Fe/OH = 100: 60, 80, or 100: 1, 2, 3, 4, or 5: 1/10, 1/20, 1/50, 1/100, or 1/200 (Run Nos. 89 to 99).

g. In a similar manner and using 1.09 g of calcium acetate dissolved in 100 ml of 1.4%-aqueous ammonia, a gypsum composition was prepared with the following formulation: calcined gypsum: water: PVA: Ca/OH: ammonia = 100: 3: 1/100: 0.03 (Run No. 100).

In Table 8 are shown the results of testing for physical properties of the gypsum compositions (a) to (g) which had been dried at 60° C. for 48 hours.

Table 8

| | Formulation | | | | | |
|---|---|---|---|---|---|---|
| Run No. | Water (PHG) | PVA (PHG) | Metal compound | M/OH | Additive | Amount of additive (PHG) |
| 84 | 80 | 3 | $AlCl_3 \cdot 6H_2O$ | 1/50 | 1.8N HCl | 0.65 |
| 85 | " | " | $SiO_2$ | " | 2.8 %-aq. ammonia | 0.05 |
| 86 | " | " | $SnCl_2 \cdot 2H_2O$ | " | 1N HCl | 0.36 |
| 87 | " | " | $V_2O_5$ | " | 3.6N HCl | 1.3 |
| 88 | " | " | $MnO_2$ | " | 1.4 %-aq. ammonia | 0.03 |
| 89 | 60 | 3 | $FeCl_3 \cdot 6H_2O$ | " | — | — |
| 90 | 80 | 1 | " | " | — | — |
| 91 | " | 2 | " | " | — | — |
| 92 | " | 3 | " | 1/200 | — | — |
| 93 | " | " | " | 1/100 | — | — |
| 94 | " | " | " | 1/50 | — | — |
| 95 | " | " | " | 1/20 | — | — |
| 96 | " | " | " | 1/10 | — | — |
| 97 | " | 4 | " | 1/50 | — | — |
| 98 | " | 5 | " | " | — | — |
| 99 | 100 | 3 | " | " | — | — |
| 100 | 100 | 3 | $Ca(CH_3COO)_2$ | 1/100 | 1.4 %-aq. ammonia | 0.03 |

| Specific gravity ($\rho$ = g/cm³) | Specific strength | | | |
|---|---|---|---|---|
| | Flexural kg/cm²/$\rho$ | Compressive (kg/cm²/$\rho$) | Izod impact strength (kg.cm/cm²/$\rho$) | Pencil hardness |
| 0.95 | 84 | 71 | 1.0 | 4H |
| 0.93 | 77 | 90 | 1.0 | 6H |
| 0.92 | 97 | 117 | 1.2 | 5H |
| 1.01 | 68 | 92 | 1.1 | 3H |
| 0.91 | 63 | 81 | 1.0 | 4H |
| 1.10 | 98 | 155 | 1.7 | 5H |
| 1.01 | 56 | 111 | 0.9 | 4H |
| 1.01 | 68 | 77 | 0.9 | 5H |
| 1.02 | 71 | 82 | 1.1 | 6H |
| 0.94 | 73 | 71 | 1.4 | 5H |
| 1.00 | 89 | 108 | 1.2 | 5H |
| 0.98 | 86 | 95 | 2.5 | 6H |
| 1.00 | 73 | 74 | 1.0 | 5H |
| 0.99 | 96 | 103 | 1.1 | 5H |
| 0.89 | 93 | 85 | 1.0 | 5H |
| 0.99 | 81 | 96 | 1.4 | 5H |

Table 8-continued

| | | | | |
|---|---|---|---|---|
| 0.86 | 108 | 115 | 1.2 | 6H |

From Table 8 it is seen that with the addition of an aqueous solution of compounds of metals of Group IIa, IIIa, IVa, Vb, and VIIb the surface hardness becomes higher and the water resistance shows a tendency similar to that mentioned in Example 1.

What is claimed is:

1. A gypsum composition obtained by molding and drying an aqueous slurry consisting essentially of (1) calcined gypsum, (2) 0.1 to 50% by weight, based on the weight of the calcined gypsum, of polyvinyl alcohol, (3) an aqueous solution of at least one metal compound selected from the group consisting of compounds of metals of Groups Ib, II, IIIa, IV, Vb, VIb, VIIb and VIII of the periodic Table, the amount of the metal compound being such that the ratio of metal atom to hydroxyl group in the polyvinyl alcohol is from 0.001 to 1, and (4) 50 to 120% by weight, based on the weight of the calcined gypsum, of water.

2. A composition according to claim 1, wherein the polyvinyl alcohol has a degree of saponification of 80 to 100%.

3. A composition according to claim 1, wherein the polyvinyl alcohol has a degree of saponfication of 100%.

4. A composition according to claim 1, wherein the metal is selected from the group consisting of Cu, Ag, Au, Be, Mg, Ca, Sr, Ba, Zn, Cd, Hg, Al, Sn, Pb, Ti, Zr, V, Nb, Cr, Mo, W, Mn, Fe, Co and Ni.

5. A composition according to claim 1, wherein the metal is selected from the group consisting of Cu, Ca, Zn, Al, Sn, Ti, Cr, Mo, Mn, Fe and Ni.

6. A composition according to claim 1, wherein the metal is selected from the group consisting of Cu, Ca, Sn, Ti, Cr, Mo, Mn, Fe and Ni.

7. A composition according to claim 1, wherein the metal is selected from the group consisting of Ca, and Ti.

8. A composition according to claim 1, wherein the metal compound is selected from the group consisting of calcium acetate, and titanium sulfate.

* * * * *